March 9, 1937.  J. S. MANTON  2,073,217
BICYCLE LOCK
Filed May 7, 1936
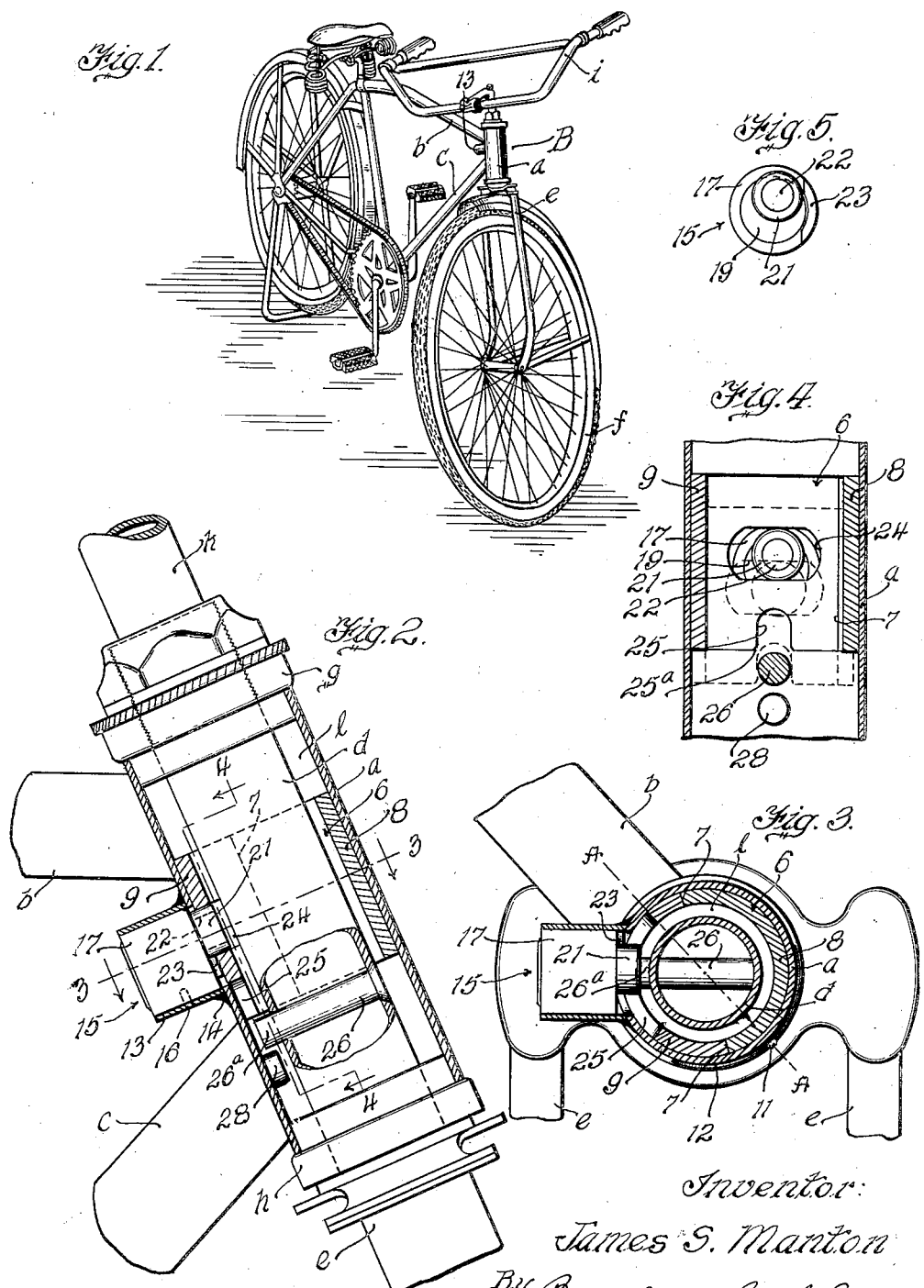

Patented Mar. 9, 1937

2,073,217

UNITED STATES PATENT OFFICE 2,073,217

BICYCLE LOCK

James S. Manton, Oak Park, Ill.

Application May 7, 1936, Serial No. 78,347

8 Claims. (Cl. 70—185)

My invention relates to locking means, and has to do more particularly with locking means suitable for use with bicycles and like structures.

Broadly, the present invention may be characterized as an improvement over the locking means shown in my Patent No. 1,998,512, granted April 23, 1935.

More specifically, the invention consists in certain novel combinations and arrangements of parts, providing for increased ruggedness, durability, efficiency, and greater ease of assembly, as will hereinafter be more fully set forth and claimed.

In describing the invention, reference is had to the accompanying drawing, wherein I have disclosed the preferred physical embodiment of my invention, and in which:

Figure 1 is a perspective view of a bicycle with locking means in accordance with my invention applied thereto;

Figure 2 is a vertical sectional view through the head of the bicycle frame and associated parts, embodying the locking means of my invention, parts being shown in elevation and parts being broken away;

Figure 3 is a section taken substantially on line 3—3 of Figure 2, parts being shown in elevation;

Figure 4 is a section taken substantially on line 4—4 of Figure 2; and

Figure 5 is an inner end view of the cylinder lock.

I have disclosed the locking device of my invention, by way of illustration, as applied to a bicycle B of known construction having a frame comprising a tubular head $a$, and an upper horizontal bar $b$ and a reach bar $c$, rigidly secured to the head in a known manner. Head $a$ receives stem $d$ of a fork $e$ within which is suitably mounted front wheel $f$ of the bicycle. Stem $d$ is mounted to turn in bearing structures $g$ and $h$ of known type mounted in the upper and lower ends, respectively, of a head $a$ in a known manner. A handle bar $i$ is disposed at the upper end of head $a$ and has a depending shank $k$ suitably secured to stem $d$ in a known manner, for steering purposes. Stem $d$ of fork $e$ is disposed in concentric spaced relation to head $a$, leaving within the head a space $l$ of appreciable width extending about the stem. The bicycle so far described is of known construction and the space $l$ within the head $a$ is ordinarily not utilized for any useful purpose, this space being due to the mounting of the stem $d$ in the bearing structures $g$ and $h$, which is the common practice in constructing bicycles of known type.

In applying the locking means of my invention to a bicycle, I utilize the space $l$ for housing a tubular structure in the form of a sleeve 6. This sleeve extends around stem $d$, the inner surface of the sleeve being spaced from the stem, while the outer surface of the sleeve snugly fits the inner surface of head $a$. Sleeve 6 may be formed of any suitable or preferred metal, and it is split longitudinally for its full length, as indicated at 7, thereby providing an arcuate-shaped guide member 8 and an arcuate-shaped locking member 9. Guide member 8 is held stationary with respect to and rigidly secured to inner surface of head $a$, as by brazing, welding, or in any other suitable or preferred manner, while locking member 9 is adapted to be moved relatively to both head $a$ and guide member 8. It will be noted that as guide member 8 is held rigid with respect to head $a$, it will provide a bearing guide to maintain locking member 9 in firm contact with the inner surface of the head, and to restrain rotation of such latter member with respect to the head. Preferably, the sleeve is disposed in head $a$ with the split 7 offset with respect to a plane A—A through the head so that the movement of the locking member 9 will not be interfered with by screws 11, which secure a name plate 12 to the outer surface of the head.

A cylindrical collar 13 is brazed, as indicated at 14, or otherwise suitably secured to head $a$ and extends radially therefrom, the interior of this collar being in register with a corresponding opening through the head into the space $l$. A cylinder lock 15, of the pin type and of known construction, is mounted in collar 13 and secured therein in a suitable manner, as by means of a blind pin 16. This lock comprises a cylindrical barrel or casing 17 within which a cylinder 19 is mounted for rotation, this cylinder normally being locked against rotation by pins which can be released by insertion of a proper key into the cylinder. A disc 21 is mounted upon the inner end of the cylinder by means of a pin 22, both the pin and the disc being located eccentric to the cylinder. Casing or barrel 17 is provided, at its inner end, with an inwardly projecting flange 23 which extends slightly less than one-half of the circumference of the barrel, and as the disc 21 projects out beyond cylinder 19 it will contact flange 23 and limit turning movement of the cylinder in either direction and permit of turning of cylinder 19 through an arc of 180 degrees in either direction. While the provision of flange 23 for limiting turning movement of cylinder 19 in the manner described is preferred, this is not essential, and flange 23 may be omitted if desired.

The lock is of known type and need not be described in greater detail, it sufficing to note that the lock is provided with a rotatable cylinder having, at its inner end, an eccentrically mounted disc or equivalent member.

Locking member 9 is provided with a transverse slot 24 of proper width for snugly receiving disc 21, this disc contacting locking member 9 at the top and bottom of the slot. Locking member 9 is further provided with a lengthwise slot 25 extending upwardly from the lower end thereof, the lower portion of this slot preferably being slightly flared at 25a, as shown in Figure 4. A pin 26 is secured through stem $d$ of fork $e$ and projects beyond the stem to provide a locking finger 26a. This finger is of proper diameter to enter slot 25 of locking member 9 when the latter is in its lowered or operative position, as indicated in dotted lines in Figure 4. The pin 26 is so disposed that fork $e$ is turned so as to direct the front wheel $f$ laterally of the frame of the bicycle at a considerable angle thereto, as in Figure 1, when locking finger 26a is aligned with slot 25. With front wheel $f$ of the bicycle disposed in this manner, the bicycle cannot be ridden straight ahead, but can be ridden in a circle only, the radius of which is determined by the angle at which the front wheel $f$ is set.

In order to lock the bicycle, front wheel $f$ is turned into the position shown in Figure 1, and lock 15 is then operated by means of its key so as to turn cylinder 19 through an arc of 180 degrees, thus lowering locking member 9 into operative position, at which time locking finger 26a of pin 26 is disposed in slot 25 of locking member 9. This effectively locks fork $e$ against turning movement, since locking member 9 is held against turning movement in head $a$, which serves to lock the bicycle so as to prevent theft thereof. Turning of cylinder 19 of the lock in the opposite direction returns locking member 9 to its normal raised or inoperative position, in which position locking member 9 is disposed above pin 26, thus releasing stem $d$ of fork $e$ and permitting steering of the bicycle in the usual manner. By providing a locking member which operates to lock the bicycle when the former is moved in a downward direction, it has been found that the various parts of the locking means may be made of increased strength, thereby providing for greater durability and efficiency. Moreover, in the instant invention it is not necessary to pass pin 26 upwardly through sleeve 6 in assembly of the device. This permits of greater ease of assembling and disassembling of the head and fork and handle bar structure, and it also permits the sleeve 6 to be made of increased thickness of metal and permits the pin 26 to project to a greater extent into space $l$ of the head and thereby to more firmly engage in slot 25 of locking member 9. It will be noted, however, that the stem $d$ cannot be withdrawn from head $a$ when locking member 9 is in its lowered or operative position, since, at this time, stem $d$ is held against turning movement and finger 26a of pin 26 cannot be brought into position to pass by a pin 28, which is brazed or otherwise suitably secured to inner surface of head $a$ and projects therefrom immediately below finger 26a.

The locking device of my invention is particularly suitable for use with bicycles and like structures, as pointed out above. I do not limit my invention to this single use, however, since it is well adapted for many other purposes, and is particularly suitable for use in connection with a tubular head or casing and a stem or equivalent member mounted for turning movement within the head or casing and spaced therefrom. It will also be understood, by those skilled in the art, that changes in construction and arrangement of parts of my invention may be resorted to without departing from the field and scope of the same, and I intend to include all such variations as fall within the scope of the appended claims, in this application in which the preferred form only of my invention is disclosed.

What I claim is:

1. In combination in locking means of the character described, a fixed tubular head, a stem extending into said head in concentric spaced relation thereto and mounted for turning movement, a tubular structure disposed within the space between the stem and the head, said tubular structure comprising a locking member slidable lengthwise of the head into operative or inoperative positions and a fixed guide member providing a bearing guide for said locking member, a locking element rigid with and projecting from said stem, said locking member having means engageable with said locking element in the operative position of said locking member, a lock accessible exteriorly of said head, and operating connections between said lock and said locking member for moving the latter into operative position and inoperative position and locking it in adjustment.

2. In combination in locking means of the character described, a fixed tubular head, a stem extending into said head in concentric spaced relation thereto and mounted for turning movement, a tubular structure disposed within the space between the stem and the head, said tubular structure comprising a locking member, and a fixed guide member providing a bearing guide for said locking member, said locking member having a slot formed therein and being slidable lengthwise of the head into operative or inoperative positions, a pin rigid with and projecting from said stem and engageable into said slot in the operative position of said locking member, a lock accessible exteriorly of said head, and operating connections between said lock and said locking member for moving the latter into operative position and inoperative position and locking it in adjustment.

3. In combination in locking means of the character described, a fixed tubular head, a stem extending into said head in concentric spaced relation thereto and mounted for turning movement, a sleeve disposed within the space between the stem and the head and with its outer surface snugly abutting the inner surface of said head, said sleeve being split for its full length to thereby provide a locking member and a guide member, said guide member being rigidly secured to said head and said locking member being slidably lengthwise of said head into operative or inoperative positions and guided and restrained from rotation during such movement by said guide member, a locking element rigid with and projecting from said stem, said locking member having a slot engageable with said locking element in the operative position of said locking member, a lock accessible exteriorly of said head, and operating connections between said lock and said locking member for moving the latter into operative position and inoperative position and locking it in adjustment.

4. In combination in locking means of the character described, a fixed tubular head, a stem extending into said head in concentric spaced relation thereto and mounted for turning movement, a locking member disposed within the space between said stem and said head and slidable lengthwise of the latter into operative position and inoperative position, means associated with said head to restrain rotation of and guide said member in its movement relative to said head, said member being slotted from its lower end, a locking element rigid with and projecting from said stem and engageable into said slot in the lowered position of said locking member, a lock accessible exteriorly of said head, and operating connections between said lock and said locking member for raising and lowering the latter and locking it in adjustment.

5. In combination in locking means of the character described, a fixed tubular head, a stem extending into said head in concentric spaced relation thereto and mounted for turning movement, a locking member disposed within the space between said stem and said head and slidable lengthwise of the latter into operative position and inoperative position, means associated with said head to restrain rotation of and guide said member in its movement relative to said head, said member being slotted from its lower end, a pin secured to and projecting from said stem and engageable into said slot in the lowered position of said locking member, a key controlled lock mounted on the head, operating connections between said lock and said locking member for raising and lowering the latter and locking it in adjustment, and means carried by said head and projecting immediately below said pin when said member is in its lowered position to restrain withdrawal of said stem from said head.

6. In combination in locking means of the character described, a fixed tubular head, a stem extending into said head in concentric spaced relation thereto and mounted for turning movement, an arcuate-shaped locking member disposed in the space between said stem and said head and slidable lengthwise thereof into operative and inoperative positions, an arcuate-shaped guide member disposed in the space between said stem and said head opposite said locking member, said guide member being fixed to said head and said members having their lateral edges in abutting engagement, a locking element rigid with and projecting from said stem, said locking member having means engageable with said locking element in the operative position of said locking member, a lock accessible exteriorly of said head, said lock comprising a cylinder mounted to turn on an axis substantially perpendicular to the head, and an eccentric connection between the inner end of the cylinder and said locking member for shifting the latter lengthwise of said head upon rotation of said cylinder.

7. In combination in locking means of the character described, a fixed tubular head, a stem extending into said head in concentric spaced relation thereto and mounted for turning movement, an arcuate-shaped locking member disposed in the space between said stem and said head and slidable lengthwise thereof into operative and inoperative positions, an arcuate-shaped guide member disposed in the space between said stem and said head opposite said locking member, said guide member being fixed to said head and said members having their lateral edges in abutting engagement, a locking element rigid with and projecting from said stem, said locking member having a slot extending from the lower end thereof and engageable with said locking element in the lowered position of said locking member, the locking member being provided with a transverse slot and the head having an opening aligned with said latter slot, a lock casing secured to said head around said opening, a lock secured in the casing and comprising a cylinder mounted to turn on an axis substantially perpendicular to the head, a pin secured to the inner end of said cylinder eccentrically thereof, and a disc carried by said pin and projecting into said transverse slot for shifting the locking member lengthwise of the head upon rotation of said cylinder.

8. In combination in locking means of the character described, a fixed tubular head, a stem extending into said head in concentric spaced relation thereto and mounted for turning movement, an arcuate-shaped locking member disposed in the space between said stem and said head and slidable lengthwise thereof into operative and inoperative positions, an arcuate-shaped guide member disposed in the space between said stem and said head opposite said locking member, said guide member being fixed to said head and said members having their lateral edges in abutting engagement, a locking element rigid with and projecting from said stem, said locking member having a slot extending from the lower end thereof and engageable with said locking element in the lowered position of said locking member, a lock accessible exteriorly of said head, said lock comprising a cylinder mounted to turn on an axis substantially perpendicular to the head, a pin secured to the inner end of said cylinder eccentrically thereof, and a disc carried by said pin, said locking member having means cooperating with said disc to shift said locking member lengthwise of said head upon rotation of said cylinder.

JAMES S. MANTON.